United States Patent [19]

Oshina et al.

[11] Patent Number: 5,048,294

[45] Date of Patent: Sep. 17, 1991

[54] SAFETY DEVICE FOR HYDRAULIC CLOSED CIRCUIT

[75] Inventors: Morio Oshina, Ibargi; Takashi Kanai, Kashiwa; Masami Ochiai; Koji Nozaki, both of Ibaragi, all of Japan

[73] Assignee: Hitachi Construction Machinery Co., Ltd., Toyota, Japan

[21] Appl. No.: 578,350

[22] Filed: Sep. 6, 1990

Related U.S. Application Data

[62] Division of Ser. No. 276,019, Nov. 25, 1989, abandoned.

[30] Foreign Application Priority Data

Nov. 28, 1987 [JP] Japan ............................... 62-301258
Nov. 28, 1987 [JP] Japan ............................... 63-301259
Oct. 17, 1988 [JP] Japan ............................... 63-260995

[51] Int. Cl.⁵ ........................................ F15B 9/04
[52] U.S. Cl. ........................................ 60/468; 60/434; 60/444; 60/488
[58] Field of Search ............... 60/434, 443, 444, 464, 60/465, 468, 494, 488

[56] References Cited

U.S. PATENT DOCUMENTS

| | | | |
|---|---|---|---|
| 3,139,723 | 7/1964 | Hollowell | 60/449 X |
| 3,543,508 | 12/1970 | Schwab | 60/449 |
| 3,593,519 | 6/1971 | Fuhrimann | 60/464 X |
| 3,871,177 | 3/1975 | Ridlen | 60/449 X |
| 3,890,360 | 6/1975 | Pruvot et al. | 60/449 X |
| 3,932,993 | 1/1976 | Riedhammer | 60/449 X |
| 3,943,715 | 3/1976 | Miyao et al. | 60/449 X |
| 4,167,855 | 9/1979 | Knapp . | |
| 4,180,979 | 1/1980 | Cornell | 60/449 X |
| 4,274,257 | 6/1981 | Koch et al. | 60/449 X |
| 4,317,331 | 3/1982 | Aruga et al. | 60/468 X |
| 4,495,767 | 1/1985 | Akiyma et al. | 60/468 X |
| 4,600,364 | 7/1986 | Nakatani et al. | 60/449 X |
| 4,745,746 | 5/1988 | Geringer | 60/449 X |
| 4,809,504 | 3/1989 | Izumi et al. | 60/449 X |
| 5,003,776 | 4/1991 | Kanai et al. | 60/434 |

Primary Examiner—Edward K. Look
Assistant Examiner—George Kapsalas
Attorney, Agent, or Firm—Oliff & Berridge

[57] ABSTRACT

A variable displacement hydraulic pump and a hydraulic motor are connected in a closed circuit. A pressure oil supply means includes the variable displacement hydraulic pump and a tilting controlling means for controlling a tilt angle of the hydraulic pump and supplies an amount of pressure oil corresponding to the tilt angle of the hydraulic pump to the hydraulic motor. When rotation of a prime mover is detected by a rotation detecting means, an opening and closing valve is changed over to a first position in which the pressure oil supply means is permitted to supply pressure oil. When stopping of the prime mover is detected by the rotation detecting means, the opening and closing valve is changed to a second position in which the pressure oil supply means is inhibited from supplying pressure oil. Upon starting of the prime mover, at least the opening and closing valve remains at the second position, and the tilting controlling means increases its tilt angle from its neutral position so that the pressure oil supply means supplies pressure oil. Consequently, upon re-starting of the prime mover, pressure oil is prevented from being supplied inadvertently to the hydraulic motor, and the safety upon starting is assured.

8 Claims, 9 Drawing Sheets

SAFETY DEVICE FOR HYDRAULIC CLOSED CIRCUIT

This is a division of application Ser. No. 07/276,019 filed Nov. 25, 1988, now abandoned.

BACKGROUND OF THE INVENTION

1. Field of the Invention

This invention relates to a hydraulic closed circuit for use with a construction machine or an industrial vehicle, and more particularly to a safety device for a hydraulic closed circuit which is effective upon starting of a prime mover when the temperature is very low.

2. Description of the Prior Art

An exemplary one of conventional hydraulic closed circuits is shown in FIG. 8. Referring to FIG. 8, if a starter switch 2 is turned on when an operating lever 1 is at its neutral position, a battery 4 and a starter motor 5 are connected to each other via a relay 3, so that an engine 6 is started to rotate a variable displacement hydraulic pump 11 and a charge pump 12. Delivered oil from the charge pump 12 is introduced from the downstream side of a restrictor 13 into left and right cylinder chambers 16a and 16b of a tiltable cylinder 16 by way of a control valve 14 and a pair of pipe lines 15A and 15B. The cylinder chambers 16a and 16b thus have an equal internal pressure, and accordingly, a piston 16c of the tiltable cylinder 16 is positioned at its neutral position wherein the amount of tilting motion of the variable displacement hydraulic pump 11 is set to zero to restrict the delivery from the variable displacement hydraulic pump 11 to zero.

If the operating lever 1 is operated to change over the control valve 14 to a side thereof denoted by l, then the pressure on the upstream side of the restrictor 13 acts upon the cylinder chamber 16a while the pressure on the downstream side of the restrictor 13 acts upon the other cylinder chamber 16b, the piston 16c is displaced leftwardly in FIG. 8 by a distance corresponding to a difference between the pressures on the opposite sides of the restrictor 13, thereby setting an amount of tilting motion of the variable displacement hydraulic pump 11. Consequently, the variable displacement hydraulic pump 11 delivers pressure oil by an amount corresponding to the thus set amount of tilting motion into a main pipe line 17A to rotate a hydraulic motor 18 forwardly. On the contrary, if the control valve 14 is changed over to the other side denoted by m, then an amount of tilting motion of the variable displacement hydraulic pump 11 is set in the reverse direction, and consequently, pressure oil is delivered into another main pipe line 17B to rotate the hydraulic motor 18 reversely. 19 is crossover load relief valve and 20 is a flashing valve. A pair of check valves 21A and 21B are connected to the charge pump 12 by way of a pair of pipe lines 22a and 22b.

A position of the operating lever 1 is detected by a switch 7. When the operating lever 1 is, for example, at its neutral position, the switch 7 assumes its on position so that a coil 3C of the relay 3 is energized to close a switch 3S of the relay 3 to interconnect the starter switch 2 and the starter motor 5. Thus, only when the operating lever 1 is at its neutral position, starting of the engine 6 is permitted. To the contrary, if the operating lever 1 is operated, then the relay switch 3S is opened so that the engine 6 cannot be started. As a result, when the engine 6 is started, the variable displacement hydraulic pump 11 will not deliver pressure oil therefrom, thereby assuring the safety upon starting.

However, when the temperature is very low, the viscosity of operating oil is very high and accordingly the resistance of oil to the individual pipe lines is very high. This will raise the following problems.

In particular, if the engine 6 is started and then the control valve 14 is changed over to the l side, the pressures on the opposite sides of the restrictor 13 act upon the cylinder chambers 16a and 16b of the tilting cylinder after a predetermined delay in response due to very low temperature, so that the piston 16c is displaced in the leftward direction in FIG. 8 and the variable displacement hydraulic pump 11 delivers pressure oil to the main pipe line 17A. By the pressure oil, the hydraulic motor 18 is caused to start its rotation to drive a load, for example, to drive a vehicle to run. When the temperature is very low, however, the torque loss at the variable displacement hydraulic pump 11 and the charge pump 12 is so high and/or the viscosity of lubricating oil in the engine 6 itself is so high that the engine may stall.

If the operating lever 1 is returned to its neutral position immediately after such engine stall and then the starter switch 2 is turned on, then the engine 6 will be started because the relay switch 3S remains at its closed position. Since the pipe lines 15A and 15B are communicated with each other by way of the control valve 14 as the operating lever 1 is returned to its neutral position, the pressures within the hydraulic cylinders 16a and 16b are immediately made equal to each other. As a result, the piston 16c is returned from the leftwardly displaced position to the neutral position. In this instance, when oil discharged from the cylinder chamber 16a flows through the pipe line 15A, a high resistance acts upon the oil, so that it takes considerable time for the piston 16c to return to its neutral position.

Accordingly, there is a problem that, if the engine 6 is started before the piston 16c is returned to its neutral position, then pressure oil will be delivered from the variable displacement hydraulic pump 11 to activate the hydraulic motor 18 inadvertently although the operating lever 1 remains in its neutral position.

SUMMARY OF THE INVENTION

It is an object of the present invention to provide a safety device for a hydraulic closed circuit which prevents pressure oil from being supplied to a hydraulic motor directly after a prime mover is restarted immediately after stopping thereof when the temperature is very low.

The present invention is applied to a hydraulic closed circuit which includes, as shown in FIG. 1A which illustrates the principle of the present invention, a hydraulic motor 18; and a pressure oil supply means 100 including a variable displacement hydraulic pump 11 driven by a prime mover 6 and a tilting controlling means 16 for controlling a tilt angle of the variable displacement hydraulic pump 11, the pressure oil supply means 100 being provided to supply pressure oil to the hydraulic motor 18 in accordance with a tilt angle of the variable displacement hydraulic pump 11 by way of either one of a pair of main pipe lines 17A and 17B connected to the variable displacement hydraulic pump 11; the hydraulic motor 18 and the variable displacement hydraulic pump 11 being connected in a closed circuit.

In order to attain the object set forth hereinabove, according to the present invention, a safety device for such a hydraulic closed circuit as described just above comprises a rotation detecting means 101 for detecting a rotational condition of the prime mover 6, and an opening and closing valve means 102 having a first position in which the opening and closing valve means permits the pressure oil supply means 100 to supply pressure oil and a second position in which the opening and closing valve means inhibits the pressure oil supply means 100 from supplying pressure oil, wherein, when stopping of the prime mover 6 is detected by the detecting means, the opening and closing valve means 102 is changed over to the second position so that, when the prime mover 6 is started, at least the opening and closing valve means 102 may remain at the second position and the tilting controlling means 16 may increase its tilt angle from its neutral position to permit the pressure oil supply means 100 to supply pressure oil.

If the prime mover 6 stops its rotation, this is detected by the rotation detecting means 101, and the opening and closing valve means 102 is changed over to the second position. As a result, the pressure oil supply means 100 is disabled to make supply of pressure oil. After the prime mover 6 starts its rotation, the tilting controlling means is returned once to its neutral position, and then the pressure oil supply means 100 begins to supply pressure oil. Accordingly, when the prime mover 6 is re-started, the pressure oil supply means 100 will never supply a large amount of pressure oil at a time, thereby assuring the safety upon starting.

The present invention may be applied also to a hydraulic closed circuit which includes a variable displacement hydraulic pump driven by a prime mover, a hydraulic motor having a pair of input/output ports connected in a closed loop to a pair of input/output ports of the variable displacement hydraulic pump by way of a pair of main pipe lines, and a tilting controlling means including first and second cylinder chambers for controlling a tilt angle of the variable displacement hydraulic pump corresponding to pressure oil supplied to the first and second cylinder chambers.

The object of the present invention set forth hereinabove is attained by a safety device for such a hydraulic closed circuit as described just above which comprises a rotation detecting means for detecting a rotational condition of the prime mover, an opening and closing valve having a first position in which the opening and closing valve means disconnects the first and second cylinder chambers of the tilting controlling means from each other and a second position in which the opening and closing valve means establishes communication between the first and second cylinder chambers, and a change-over controlling means operable when stopping of the prime mover is detected by the rotation detecting means for changing over the opening and closing valve to the second position and operable when starting of the prime mover is detected for changing over the opening and closing valve to the first position.

If stopping of the prime mover is detected by the detecting means, the first and second cylinder chambers are communicated with each other by the opening and closing valve. Consequently, pressure oil will flow from the higher pressure side cylinder chamber into the lower pressure side cylinder chamber by way of the opening and closing valve. Accordingly, if the prime mover is stopped when the temperature is very low, the tilting controlling means is immediately returned to its neutral position in which the tilt angle is zero. As a result, even if the prime mover is re-started immediately after stopping of the prime mover, the variable displacement hydraulic pump will not inadvertently deliver pressure oil therefrom, thereby assuring the safety. Then, if starting of the prime mover is detected by the detecting means, the first and second cylinder chambers are disconnected from each other by the opening and closing valve. The delivering direction and the amount of delivery of oil from the variable displacement hydraulic pump are determined by oil pressure supplied into the cylinder chambers.

The present invention may be applied further to a hydraulic closed circuit which includes a variable displacement hydraulic pump driven by a prime mover, a tilting controlling means for controlling a tilt angle of the variable displacement hydraulic pump, and a hydraulic motor having a pair of input/output ports connected in a closed loop to a pair of input/output ports of the variable displacement hydraulic pump by way of a pair of main pipe lines.

The object of the present invention set forth hereinabove is attained also by a safety device for such a hydraulic closed circuit as described just above which comprises a rotation detecting means for detecting a rotational condition of the prime mover, an opening and closing valve having a first position in which the opening and closing valve disconnects the main pipe lines from each other and a second position in which the opening and closing valve establishes communication between the main pipe lines, and a change-over controlling means operable when stopping of the prime mover is detected for changing over the opening and closing valve to the second position and operable when starting of the prime mover is detected for changing over the opening and closing valve to the first position after the tilting controlling means is set to its neutral position. The change-over controlling means may be designed such that it may change over the opening and closing valve to the first position after lapse of a predetermined interval of time after the prime mover has been started or otherwise such that it may change over the opening and closing valve to the first position when the neutral position of the tilting controlling means is detected after the prime mover has been started.

If stopping of the prime mover is detected by the detecting means, the main pipe lines are communicated with each other by way of the opening and closing valve. Then, if starting of the prime mover is detected, the main pipe lines are disconnected from each other by the opening and closing valve after the tilting controlling means has been set to its neutral position. Accordingly, in case the tilting controlling means is not returned to its neutral position immediately after the prime mover is stopped as in a very low temperature condition, when the prime mover is re-started, pressure oil from the variable displacement hydraulic pump will not be supplied to the hydraulic motor and consequently the hydraulic motor will not be rotated until after the tilting controlling means is set to its neutral position. Even if the variable displacement hydraulic pump should deliver pressure oil when the prime mover is re-started directly after the prime mover has been stopped in a very low temperature condition, the hydraulic motor will not be rotated by the pressure oil. In short, the safety upon starting when the temperature is very low is assured.

The above and other objects, features and advantages of the present invention will become apparent from the following description and the appended claims, taken in conjunction with the accompanying drawings.

DETAILED DESCRIPTION OF THE PREFERRED EMBODIMENTS

First Embodiment

Figure 1A:
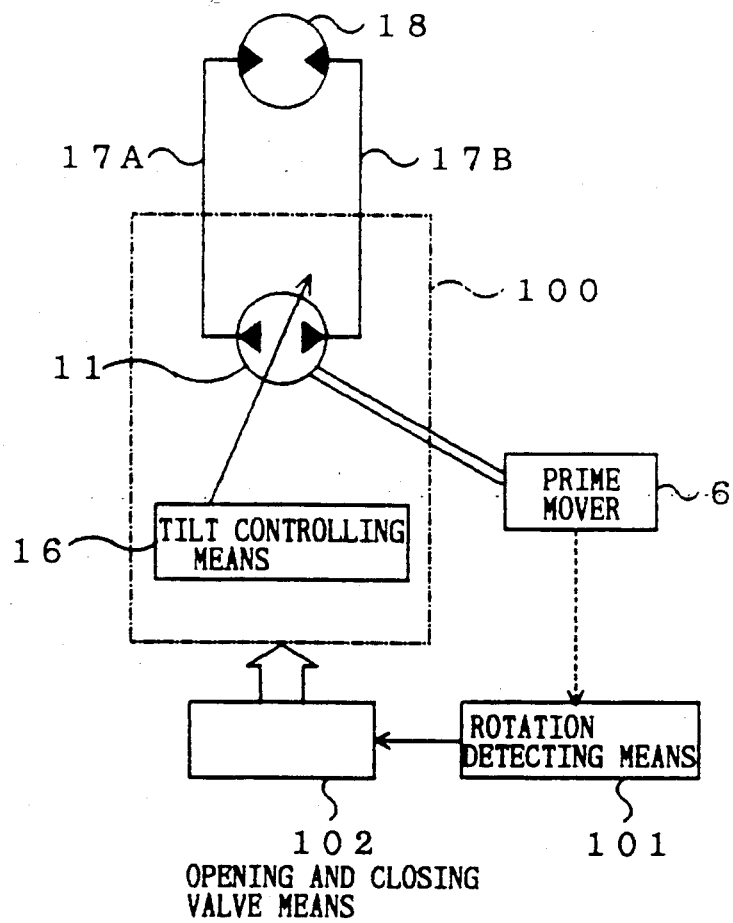
FIG. 1A is a diagrammatic representation illustrating the principle of construction of a safety device for a hydraulic closed circuit according to the present invention.
Figure 1B:
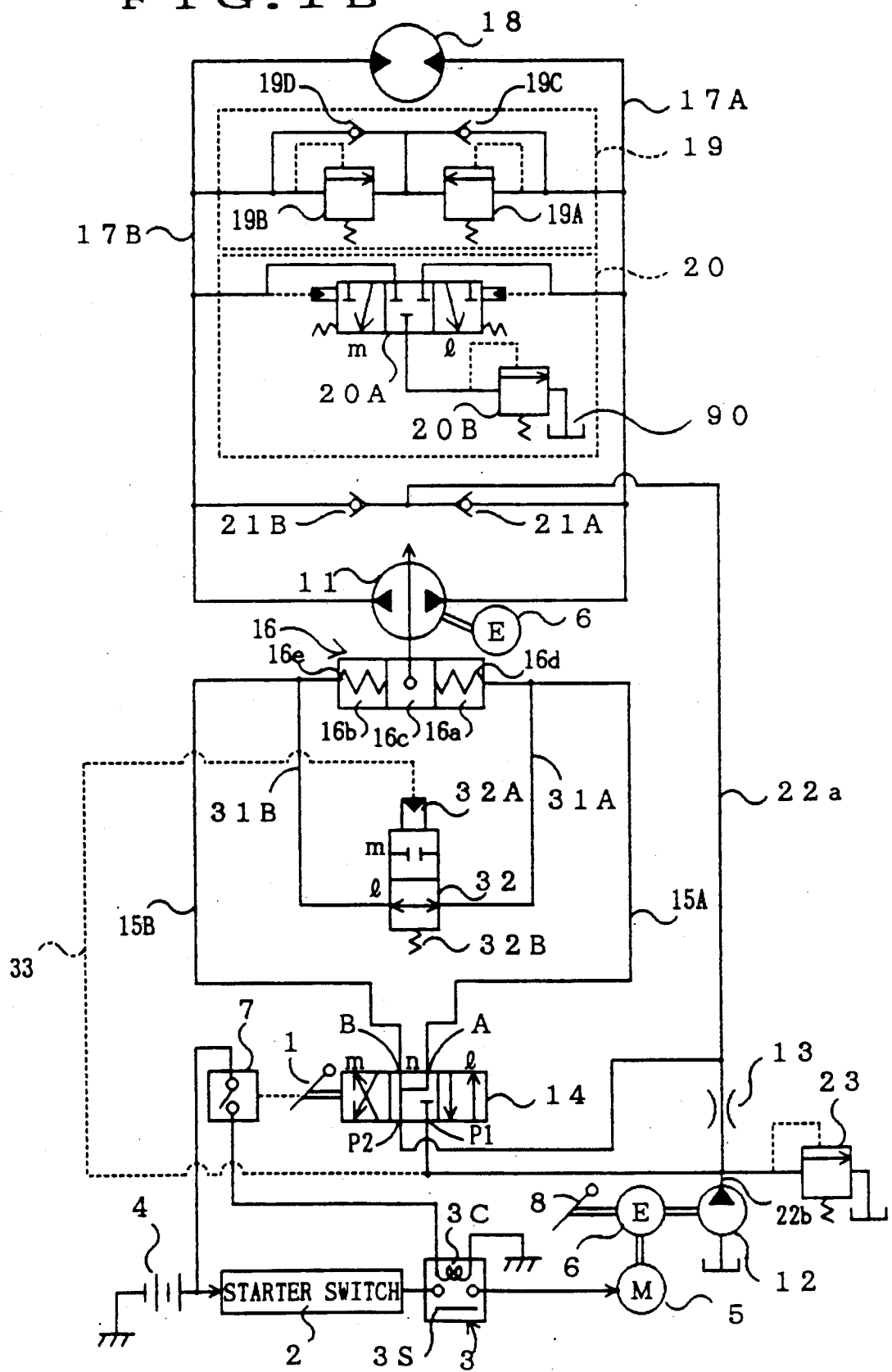
FIG. 1B is a schematic circuit diagram of a safety device for a hydraulic closed circuit showing a first embodiment of the present invention.
Figure 8:
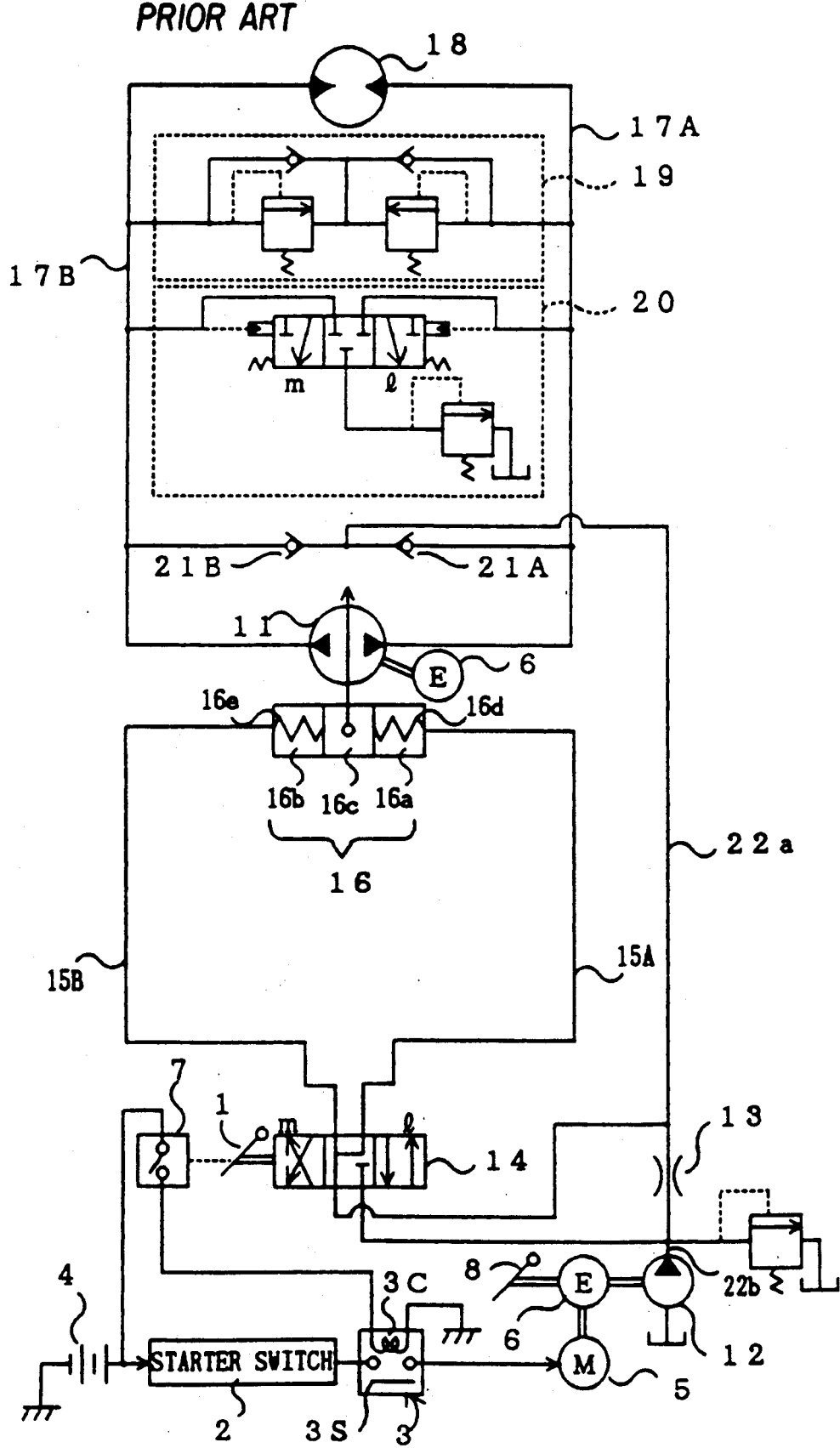
FIG. 8 is a schematic circuit diagram showing a conventional safety device for a hydraulic closed circuit.

Referring first to FIG. 1B, there is shown a safety device for a hydraulic closed circuit according to a first preferred embodiment of the present invention. In FIG. 1B, like parts or elements are denoted by like reference symbols to those of FIG. 8.

(I) Construction of the First Embodiment

A variable displacement hydraulic pump 11 and a hydraulic motor 18 are connected to each other by a pair of main pipe lines 17A and 17B. The main pipe lines 17A and 17B are connected to each other by a crossover load relief valve 19 and also to a tank 90 by way of a flashing valve 20. The main pipe lines 17A and 17B are further connected via a pair of check valves 21A and 21B, respectively, to a pipe line 22a, connected to a delivery port of a charging gear pump (hereinafter referred to as charge pump) 12.

The amount of tilting motion of the variable displacement hydraulic pump 11 is controlled by a tilting cylinder 16. The tilting cylinder 16 has a pair of left and right cylinder chambers 16a and 16b in which a pair of springs 16d and 16e are disposed, respectively, so that a piston 16c of the tilting cylinder 16 may be normally held at a neutral position by the spring forces of the springs 16d and 16e. The cylinder chambers 16a and 16b are connected to an A port and a B port of a control valve 14 by way of a pair of pipe lines 15A and 15B, respectively. The cylinder chambers 16a and 16b are also connected by way of a pair of bypass pipe lines 31A and 31B, respectively, to an opening and closing valve 32 of the pilot hydraulic change-over type having two positions. The opening and closing valve 32 thus has a pilot port 32A connected to the delivery port of the charge pump 12.

The control valve 14 is a manually operable three position directional control valve having a P1 port connected to the pipe line 22b on the upstream side of a restrictor 13 and a P2 port connected to the pipe line 22a on the downstream side of the restrictor 13. A switch 7 is operatively associated with an operating lever 1 of the control valve 14 and detects a neutral position of the operating lever 1. In particular, when the operating lever 1 assumes the neutral position, the switch 7 assumes its on position. The switch 7 is interposed between a battery 4 and a coil 3C of a relay 3. A switch 3S of the relay 3 is interposed between a starter switch 2 and a starter motor 5. Thus, when the switch 7 is turned on, a circuit of the battery 4, starter switch 2, relay switch 3S and starter motor 5 is completed so that the starter motor 5 is energized.

It is to be noted that reference numeral 8 in FIG. 1B denotes an operating member for controlling a rotational speed of an engine 6. A pair of relief valves 19A and 19B and a pair of check valves 19C and 19D are also provided and generally form a crossover load relief valve 19. If, for example, the pressure in the main pipe line 17A rises to a relief pressure of the relief valve 19A, the relief valve 19A is opened so that pressure oil will flow through the check valve 19D into the main pipe line 17B. Further, a change-over valve 20A of the hydraulic pilot type and a relief valve 20B are also provided and generally constitute a flashing valve 20. If, for example, the pressure in the main pipe line 17A rises to a pressure higher than that in the main pipe line 17B, the change-over valve 20A is changed over to its position 1 so that low pressure oil in the main pipe line 17B on the lower pressure side will flow through the change-over valve 20A and the relief valve 20B into the tank 90. A relief valve 23 for the charge system is also provided.

(II) Operation of the First Embodiment

Operation of the embodiment having such a construction as described above when the temperature is very low will be described.

(1) When the operating lever 1 is positioned at its neutral position and the starter switch 2 is turned on, then the starter motor 5 is energized to start the engine 6 because the relay switch 3S remains at its closed position. As the engine 6 is started, the charge pump 12 delivers therefrom pressure oil, which is introduced by way of the pipe line 22b and pilot pipe line 33 into the pilot port 32A of the opening and closing valve 32. The opening and closing valve 32 is changed over to the position m in which the cylinder chambers 16a and 16b are disconnected from each other. Since the operating lever 1 remains at its neutral position, the control valve 14 assumes its neutral position n, so that the pressure on the downstream side of the restrictor 13 acts upon both of the cylinders 16a and 16b of the tilting cylinder 16. Accordingly, the piston 16c assumes its neutral position. Consequently, the tilt angle of the variable displacement hydraulic pump 11 is set to zero and accordingly the amount of delivery from the variable displacement hydraulic pump 11 is zero.

When the operating lever 1 is operated to change over the control valve 14 to the l side, the pressure on the upstream side of the restrictor 13 is introduced into the cylinder chamber 16a of the tilting cylinder 16 while the pressure on the downstream side of the restrictor 13 is introduced into the other cylinder chamber 16b. Consequently, the piston 16c is displaced leftwardly in FIG. 1B by a distance corresponding to a difference between the pressures on the opposite sides of the restrictor 13 proportional to the rotational speed of the engine 6, so that the variable displacement hydraulic pump 11 delivers oil therefrom to rotate the hydraulic motor 18.

(2) In this instance, if the engine 6 should stall, the amount of delivery from the charge pump 12 is reduced to zero. Consequently, the pressures in the pipe lines 22a and 22b are reduced by a leak of the charge pump 12, and the pressure at the pilot port 32A of the opening and closing valve 32 is decreased immediately by way of the pilot pipe line 33, so that the opening and closing valve 32 is changed over to the position l by a return spring 32B. As a result, the cylinder chambers 16a and 16b are communicated with each other by way of the bypass pipe lines 31A and 31B and opening and closing valve 32.

Meanwhile, since reduction in pressure in the pipe lines 22a and 22b acts also upon the cylinder chambers 16a and 16b by way of the pipe lines 15A and 15B, respectively, the piston 16c is displaced rightwardly by the spring force accumulated in the spring 16e. In this instance, since the cylinder chamber 16a remains in communication with the other cylinder chamber 16b by way of the bypass pipe line 31A, the opening and closing valve 32 and the other bypass pipe line 31B as described hereinabove, oil which is discharged from the cylinder 16 as the piston 16c is displaced rightwardly flows along a route including the bypass pipe line 31A, the opening and closing valve 32, the other bypass pipe line 31B and the cylinder chamber 16b. Since the route can be made very short and thick comparing with a route of the pipe lines 15A and 15B, the influence of a viscous resistance is so small that the piston 16c will be immediately returned to its neutral position.

Accordingly, even if the operating lever 1 is returned to its neutral position and the starter switch 2 is turned on to re-start the engine 6 immediately after an engine stall, the amount of delivery from the variable displacement hydraulic pump 11 will remain zero and accordingly the hydraulic motor 18 will not be rotated. Thus, the safety in starting in a very low temperature condition is assured.

Figure 2:
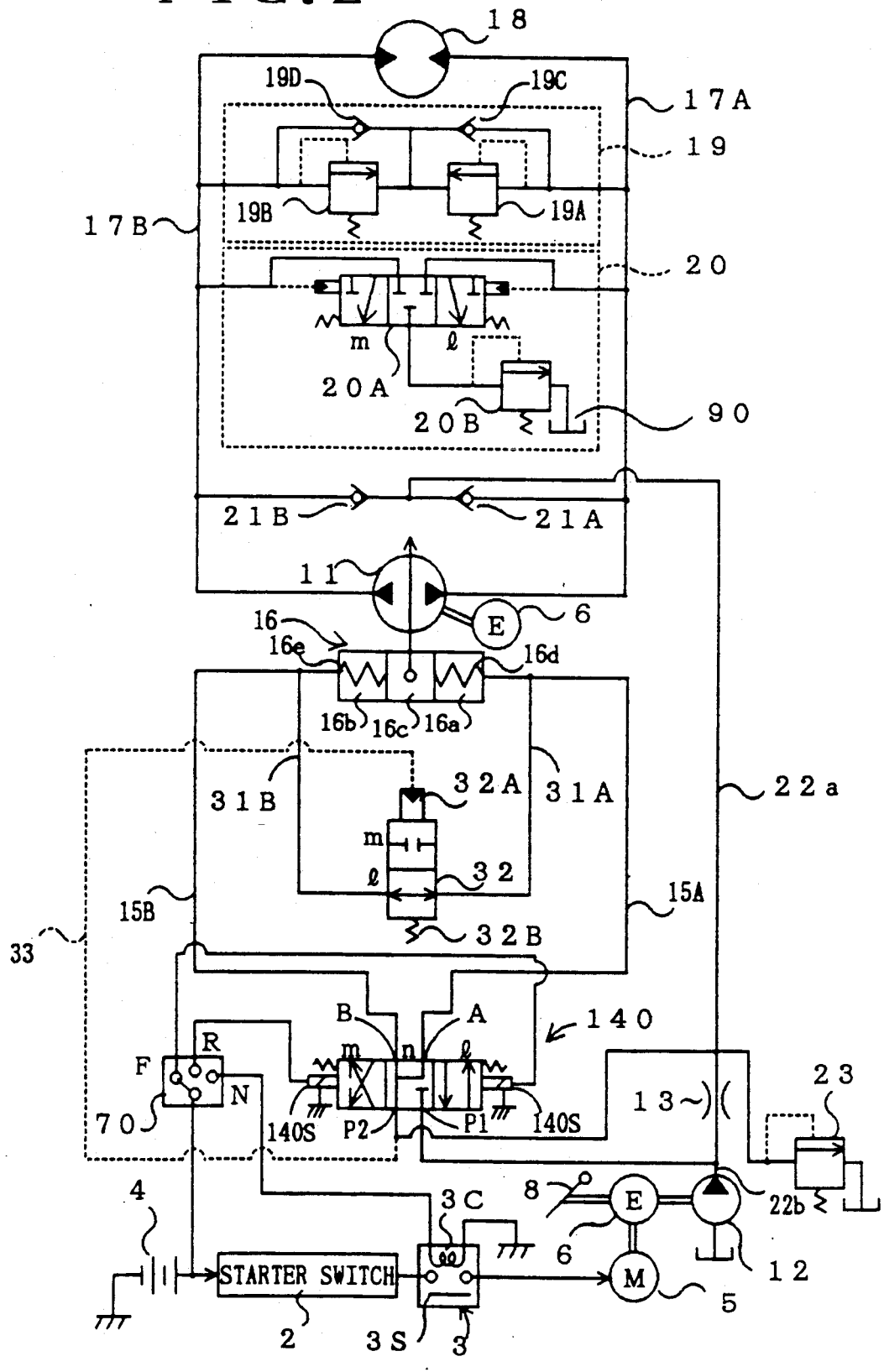
FIG. 2 is a similar view but showing a modification to the safety device of FIG. 1B.

(III) Modifications to the First Embodiment (1) A modification shown in FIG. 2 is different from the first embodiment shown in FIG. 1B in that the relief valve 23 and the pilot port 32A of the opening and closing valve 32 are connected to the pipe line 22a on the downstream side of the restrictor 13, that the manually operable control valve 14 for controlling the direction of rotation of the hydraulic motor 18 is replaced by an electromagnetic control valve 140, and that the switch 7 is omitted and instead a switch 70 for changing over the electromagnetic control valve 140 is provided.

Where the hydraulic motor 18 is utilized as a motor for running a vehicle, the switch 70 is provided with three terminals of F (forward), R (rearward) and N (neutral), and the terminals F and R are connected to a pair of solenoids 140S provided at the opposite ends of the control valve 140 while the remaining terminal N is grounded by way of the relay coil 3C.

When the engine 6 is started with the switch 70 positioned at the N position, the charge pump 12 is rotated. When the switch 70 is shifted to the F position, then the control valve 140 is changed over to the position l in which the pressure on the upstream side of the restrictor 13 is introduced into the cylinder chamber 16a of the tilting cylinder 16 and the pressure on the downstream side of the restrictor 13 is introduced into the other cylinder chamber 16b. The piston 16c is displaced in the leftward direction in FIG. 2 to a position corresponding to a difference of the pressures on the opposite sides of the restrictor 13. The tilt angle of the variable displacement hydraulic pump 11 is controlled by the piston 16c, and the hydraulic pump 11 delivers pressure oil by an amount corresponding to the thus controlled tilt angle of the variable displacement hydraulic pump 11. By the pressure oil, the hydraulic motor 18 is rotated to advance the vehicle.

If an engine stall should take place during running of the vehicle which has started its advancing movement in this manner, an operator will change over the switch 70 once to the N position, and then the engine 6 will be re-started. As a result of the engine stall, delivery of pressure oil from the charge pump 12 is also stopped. Consequently, the pressure in the pilot pipe line 33 drops immediately due to a leak of the charge pump 12, so that the opening and closing valve 32 is changed over to the position l by the spring 32B. Accordingly, the leftwardly shifted piston 16c is returned to its neutral position immediately after the engine stall as described hereinabove. As a result, the vehicle is prevented from being advanced inadvertently upon re-starting of the engine.

(2) An alternative arrangement may be employed wherein the opening and closing valve 32 is in the form of an electromagnetic opening and closing valve and a sensor for detecting rotation of the engine is provided so that the opening and closing valve 32 may be changed over to the position m by rotation of the engine but to the position l by stopping of the engine.

(3) While in the foregoing description the tilting cylinder 16 is of the type wherein the cylinder chambers 16a and 16b in pair are disposed in an opposing relationship on the left and right sides of the piston 16c and, for example, an end of a cam plate of the variable displacement hydraulic pump 11 and the piston 16c are connected to each other in order that the cam plate is tilted by a movement of the piston 16c, the present invention can be applied to such a modification that a pair of tilting cylinders are employed and piston rods of the tilting cylinders are connected to the opposite ends of the cam plate on the opposite sides of a fulcrum for rocking motion of the cam plate.

(4) Further, while in the foregoing description the two cylinders 16a and 16b are connected to or disconnected from each other by way of the opening and closing valve 32, they may otherwise be connected to or disconnected from the lower pressure side of a tank each by way of an opening and closing valve. According to this modification, when the engine is stopped, the two opening and closing valves may be opened to relieve the pressures of the cylinder chambers 16a and 16b. In this instance, the cylinder chambers 16a and 16b are connected to or disconnected from each other by way of the pair of opening and closing valves and the tank.

(IV) Construction of the Second Embodiment

Figure 3:
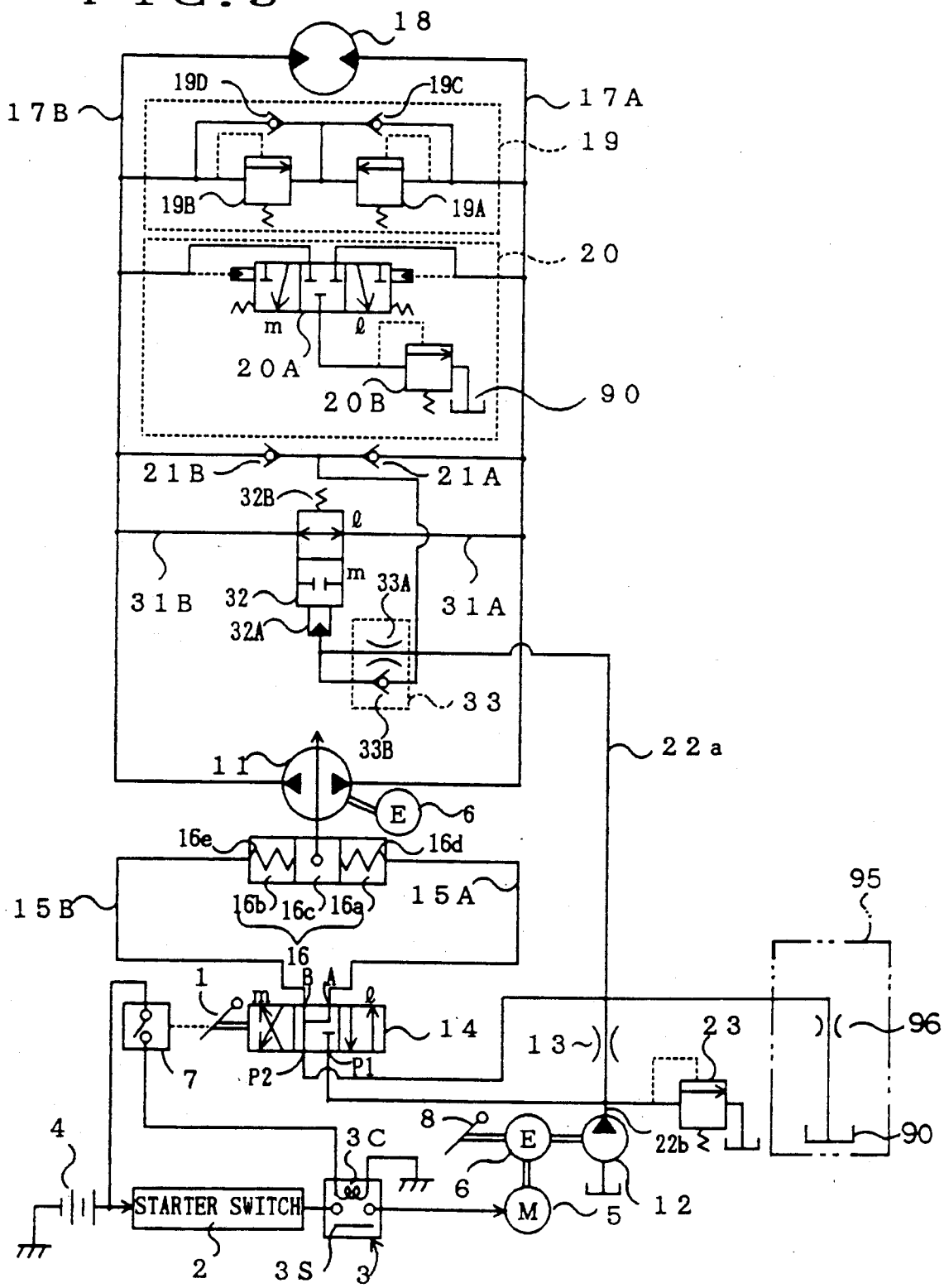
FIG. 3 is a similar view but showing a second embodiment of the present invention.

A second embodiment of the present invention will be described with reference to FIG. 3. In FIG. 3, like parts or elements are denoted by like reference symbols to those of FIG. 1B.

A pair of main pipe lines 17A and 17B which interconnect a variable displacement hydraulic pump 11 and a pair of input/output ports of a hydraulic motor 18 are connected to an opening and closing valve 32 of the hydraulic pilot type by way of a pair of bypass pipe lines 31A and 31B, respectively. A pilot port 32A of the opening and closing valve 32 is connected by way of a slow return valve 33 to a pipe line 22a connected to a delivery port of a charging gear pump (hereinafter referred to as charge pump) 12. It is to be noted the pressure for changing over the opening and closing valve 32 from a position l to another position m is set lower than a preset pressure of a relief valve 23 of the charge hydraulic circuit.

A tilting cylinder 16 for controlling the amount of tilting motion of the variable displacement hydraulic pump 11 has similar construction to that shown in FIG. 1B, and a piston 16c of the tilting cylinder 16 is normally held at its neutral position by the spring forces of a pair of springs 16d and 16e. The tilting cylinder 16 has a pair of cylinder chambers 16a and 16b which are connected to an A port and a B port of a control valve 14 by way of a pair of pipe lines 15A and 15B, respectively.

(V) Operation of the Second Embodiment

Operation of the second embodiment having such a construction as described above when the temperature is very low will be described.

(1) When a starter switch 2 is turned on with an operating lever 1 positioned at its neutral position, a starter motor 5 is energized because a switch 3S of a relay 3 is in a closed position, and consequently, an engine 6 is started. As the engine 6 is started, the charge pump 12 delivers therefrom pressure oil, which is introduced through the pipe lines 22a and 22b and a restrictor 33A of the slow return valve 33 into the pilot port 32A of the opening and closing valve 32, so that the opening and closing valve 32 is changed over to the position m. As a result, the bypass pipe lines 31A and 31B connected to the main pipe lines 17A and 17B, respectively, are disconnected from each other. When the viscosity of oil is high as in a very low temperature condition, it will take a predetermined delay time from starting of the engine 6 to closing of the opening and closing valve 32 by an action of the restrictor 33A. Since the operating lever 1 is positioned now at its neutral position as described above, the control valve 14 assumes its neutral position in which the pressure on the downstream side of the restrictor 13 acts upon both of the cylinder chambers 16a and 16b so that the piston 16c is positioned at its neutral position. Accordingly, the tilt angle of the variable displacement hydraulic pump 11 is set to zero and the amount of delivery from the variable displacement hydraulic pump 11 is zero.

When the operating lever 1 is operated to shift the control valve 14 to the l side, the pressure on the upstream side of the restrictor 13 is introduced into the cylinder chamber 16a while the pressure on the downstream side of the restrictor 13 is introduced into the other cylinder chamber 16b. Consequently, the piston 16c is displaced leftwardly in FIG. 3 by a distance corresponding to a difference between the pressures on the opposite sides of the restrictor 13 proportional to the rotational speed of the engine 6, so that the variable displacement hydraulic pump 11 delivers oil therefrom to rotate the hydraulic motor 18.

(2) In this instance, if the engine 6 should stall, the amount of delivery from the charge pump 12 is reduced to zero, and since the charge pump 12 is a gear pump, the pressures in the pipe lines 22a and 22b are decreased by a leak of the charge pump 12. Consequently, the pressure at the pilot port 32A is immediately decreased by way of the slow return valve 33, so that the opening and closing valve 32 is changed over to the position l by the spring force of the return spring 32B. As a result, the main pipe lines 17A and 17B are communicated with each other immediately after stopping of the engine 6. It is to be noted that where the leak of the pump 12 is too small, the pipe line 22a should be connected to a tank 90 by way of a restrictor 96 as indicated by a two-dot chain line block denoted by reference numeral 95.

Meanwhile, since reduction in pressure in the pipe lines 22a and 22b acts also upon the cylinder chambers 16a and 16b by way of the pipe lines 15A and 15B, respectively, the piston 16 begins to be moved rightwardly in FIG. 3 by the spring force accumulated in the spring 16e. As a result, oil discharged from the cylinder 16 as the piston 16c is displaced rightwardly flows along a route including the pipe line 15A, the control valve 14, the other pipe line 15b and the cylinder chamber 16b. In this instance, the resistance in the pipe lines is so high due to a high viscous resistance of the oil because of the very low temperature that the piston 16c will be returned to its neutral position not directly after stopping of the engine but after lapse of a predetermined interval of time.

(3) If the operating lever 1 is returned to its neutral position and the starter switch 2 is turned on to re-start the engine 6 directly after the engine stall (i.e., within a predetermined interval of time until the piston 16c is returned to its neutral position), the charge pump 12 and the variable displacement hydraulic pump 11 are rotated. The delivery pressure of the charge pump 12 acts upon the pilot port 32A of the opening and closing valve 32 after a predetermined time of delay by the restrictor 33A of the slow return valve 33 as described hereinabove, so that the opening and closing valve 32 is changed over to the position m. Consequently, the main pipe lines 17A and 17B are disconnected from each other after the predetermined delay time after starting of the engine 6. Meanwhile, if the operating lever 1 is not operated and remains at its neutral position, the variable displacement hydraulic pump 11 which is rotated upon re-starting of the engine 6 delivers pressure oil therefrom only for an interval of time until the tilting cylinder 16 is returned to its neutral position after starting of the engine 6. However, the main pipe lines 17A and 17B remain in a mutually communicating condition by way of the opening and closing valve 32 for an interval of time until after lapse of the delay time described above after re-starting of the engine 6 being in stall condition. Accordingly, oil delivered from the variable displacement hydraulic pump 11 flows along a loop formed by the main pipe lines 17A and 17B, bypass pipe lines 31A and 31B and opening and closing valve 32, so that the hydraulic motor 18 will not be rotated.

In short, if a delay time, which is longer than the interval of time until the tilting cylinder 16 is returned to its neutral position after the engine 6 has been stopped in a very low temperature condition, is set to the restrictor 33, then even if the pressure oil is delivered from the variable displacement hydraulic pump 11 upon re-starting of the engine in a very low temperature condition, pressure oil will not be supplied to the hydraulic motor 18 within the delay time. Consequently, the safety upon starting is assured.

It is to be noted that since the viscous resistance of oil is low at the normal temperature, the delay time by the restrictor 33A is reduced to a level which can be ignored in an actual operation, and accordingly there is no trouble.

Figure 4:
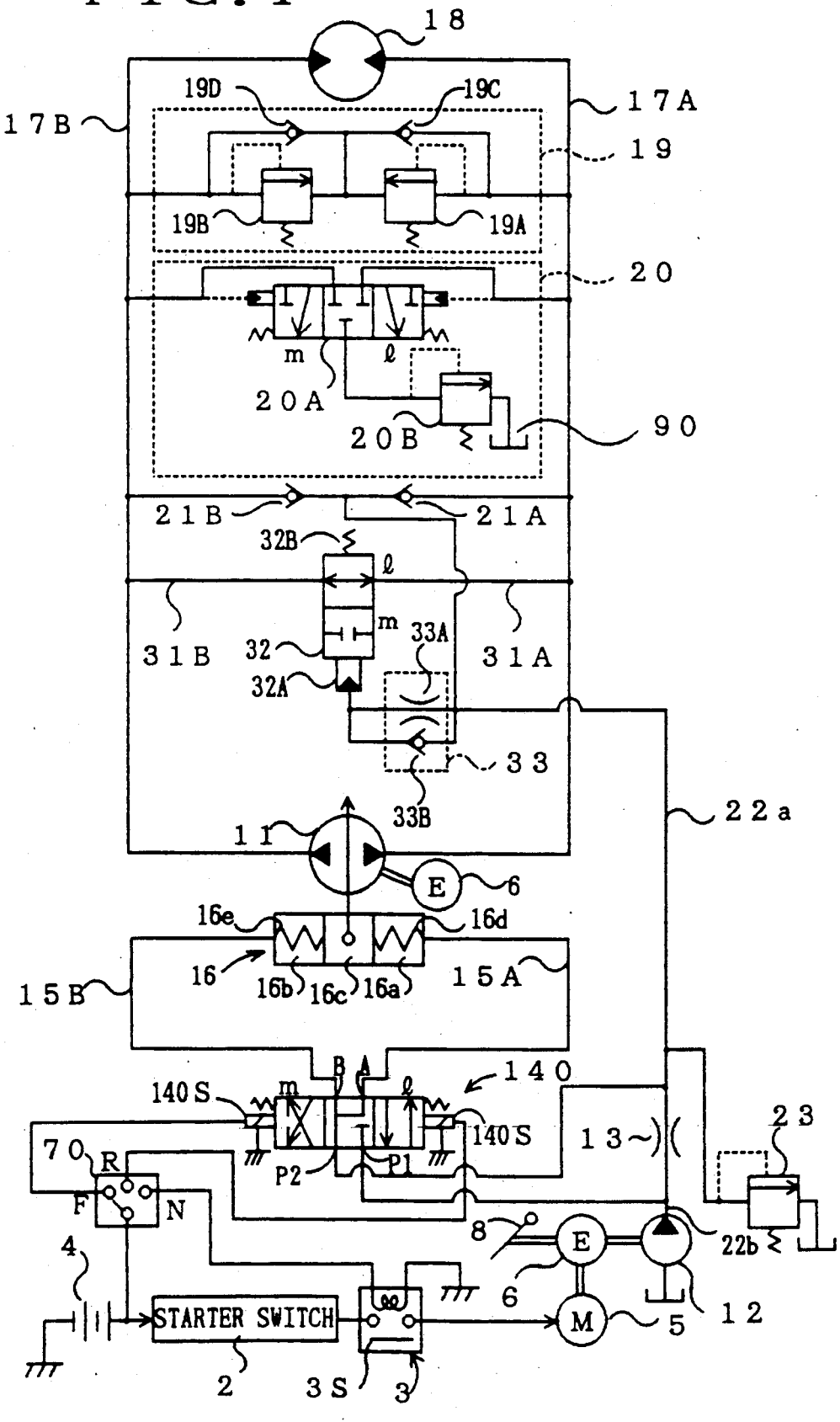
FIGS. 4 and 5 are similar views but showing two different modifications to the safety device shown in FIG. 3.

(VI) Modifications to the Second Embodiment (1) A modification shown in FIG. 4 is different from the second embodiment shown in FIG. 3 in that the relief valve 23 is connected to the pipe line 22a on the downstream side of the restrictor 13, that the manually operable control valve 14 is replaced by an electromagnetic control valve 140, and that a switch 70 for changing over the electromagnetic control valve 140 is provided in place of the switch 7.

Operation of the modification originating in the different structure is similar to corresponding operation of the modification to the first embodiment shown in FIG. 2, and operation originating in the other structure is similar to that of the second embodiment shown in FIG. 3. Accordingly, description of operation is omitted herein to avoid redundancy.

Figure 5:
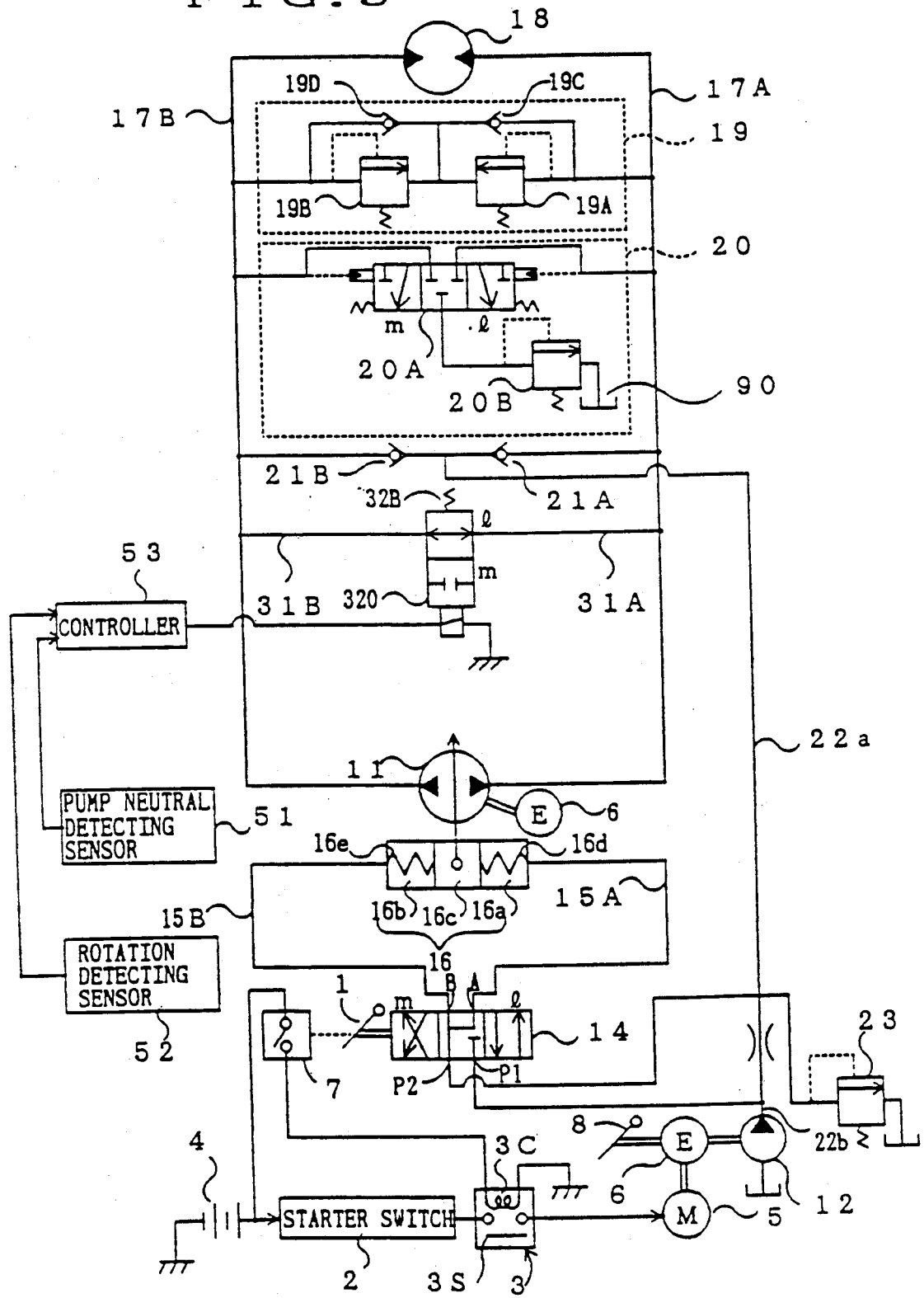
Figure 6:
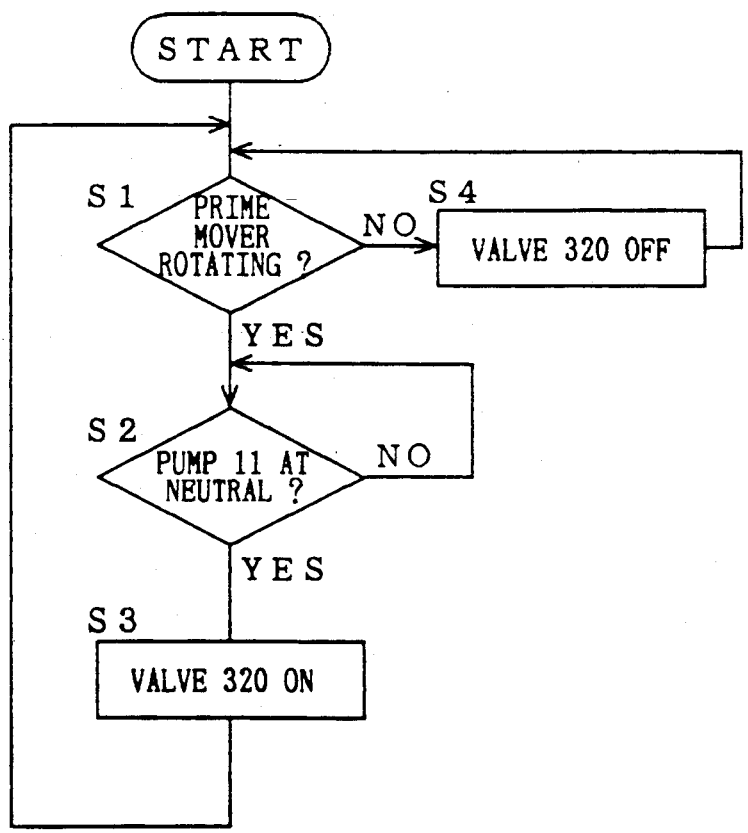
FIG. 6 is a flow chart illustrating a process of operations of a controller of the safety device shown in FIG. 5.

(2) Another modification to the second embodiment is shown in FIGS. 5 and 6. The present modification is constituted such that the opening and closing valve 32 is replaced by an electromagnetic opening and closing valve 320 and the slow return valve 33 is omitted. In the modification, the opening and closing valve 320 is changed over to the position m under the condition where the tilting cylinder 16 is positioned at its neutral position and the engine 6 is rotating, and the opening and closing valve 320 will thereafter be changed over to the position l when rotation of the engine 6 is not detected.

To this end, according to the present modification, the safety device for the hydraulic closed circuit includes a pump neutral detecting sensor 51 for detecting a neutral position of the tilting cylinder 16, a rotation detecting sensor 52 for detecting that the engine 6 is rotating, and a controller 53 for changing over the opening and closing valve 320 from the position l to the position m or vice versa in response to detection outputs of the sensors 51 and 52.

FIG. 6 illustrates a process of operation of the controller 53 shown in FIG. 5. Referring to FIG. 6, the controller 53 determines, at step S1, in accordance with a detection output from the rotation detecting sensor 52 whether or not the engine 6 is rotating. If it is determined that the engine 6 is rotating, then the controller 53 determines, at step S2, in accordance with a detection output from the pump neutral sensor 51 whether or not the tilting cylinder 16 is at its neutral position. In case the determination is in the affirmative, the controller 53 delivers, at step S3, a change-over signal to the opening and closing valve 320 so that the opening and closing valve 320 is energized and thus changed over to the position m. On the contrary, if it is determined at step S1 that the engine 6 is not rotating, the controller 53 stops, at step S4, delivery of the change-over signal so that the opening and closing valve 320 is deenergized and consequently changed over to the position l.

According to the procedure, if the two requirements are met that the engine 6 is rotating and that the tilting cylinder 16 remains at its neutral position, the opening and closing valve 320 is changed over to the position m to disconnect the main pipe lines 17A and 17B from each other. Accordingly, the hydraulic motor 18 is rotated by oil delivered from the hydraulic pump 11. Then, if the engine 6 is stopped by an engine stall, the opening and closing valve 320 is changed over to the position l so that the main pipe lines 17A and 17B are communicated with each other. In case an operator shifts the control valve 14 to its neutral position immediately after the engine stall and restarts the engine 6, if the tilting cylinder 16 is not yet returned to its neutral position under the circumstances of a very low temperature, pressure oil is delivered from the hydraulic pump 11. In this case, however, the step S2 is repeated until the tilting cylinder 16 is returned to its neutral position and the opening and closing valve 320 remains at the position l so that the main pipe lines 17A and 17B remain in a mutually communicating condition. Accordingly, there is no possibility that the hydraulic motor 18 may be rotated.

It is to be noted that the pump neutral position sensor 51 may be omitted while the construction is modified such that if stopping of rotation of the engine 6 is detected by the sensor 52, the controller 53 controls the opening and closing valve 320 to be immediately changed over to the position l, and after lapse of a predetermined time of delay after such changing over of the opening and closing valve 320, the controller 53 controls the opening and closing valve 320 to be changed over to the position m. In this instance, the delay time may be increased as a temperature of the atmosphere or oil, which is detected by a suitable detector, lowers.

Figure 7:
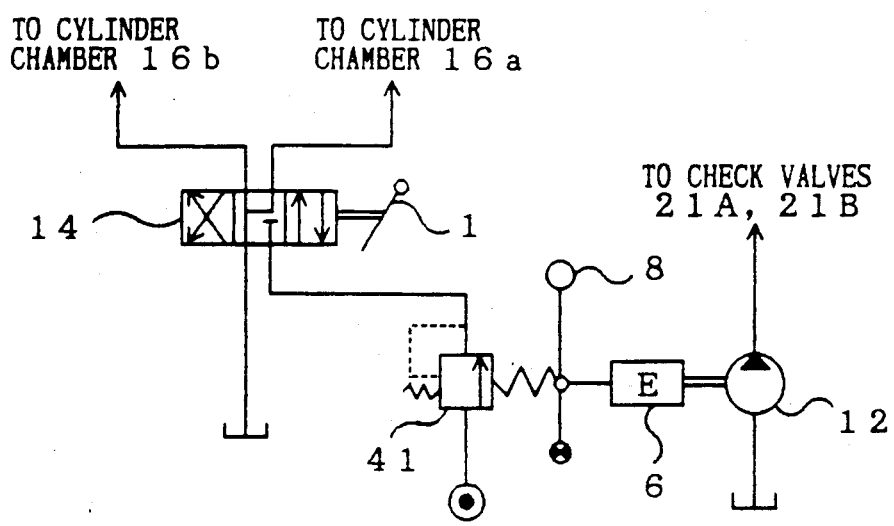
FIG. 7 is a schematic circuit diagram showing a further modification common to the safety devices of FIGS. 1B and FIG. 3.

The first and second embodiments described above can be further modified in such a manner as shown in FIG. 7. The modification will be described with reference to FIG. 7.

(VII) Modification Common to the First and Second Embodiments (1) While in the first and second embodiments the piston 16c of the tilting cylinder 16 is displaced in response to a difference between the pressures on the opposite sides of the restrictor 13 proportional to the number of rotation of the engine in order to control the amount of delivery from the variable displacement hydraulic pump 11, the present invention can be applied to such an arrangement as shown in FIG. 7. In the arrangement shown in FIG. 7, a pressure proportional to an amount of operation of an operating member 8 for controlling the rotational speed of the engine is produced by means of a pressure reducing valve 41. The pressure thus produced is introduced into the cylinder chamber 16a or 16b so as to control the amount of displacement of the piston 16c in proportion to the rotational speed or number of rotation of the engine.

(2) Further, while in the embodiments and modifications described above starting of the engine 6 is permitted only when the control valve 14 remains at its neutral position, it may be permitted otherwise when the control valve 14 is at the position l or m. Further, while the variable displacement hydraulic pump 11 and the charge pump 12 are driven by the engine 6, the present invention can be applied to an alternative apparatus wherein they are driven by an electric motor. In addition, the present invention can be applied a different apparatus wherein the hydraulic motor 18 is used for an object other than for running of a vehicle.

What is claimed is:

1. A safety device for a hydraulic closed circuit which includes a variable displacement hydraulic pump driven by a prime mover, a tilting controlling means for controlling a tilt angle of said variable displacement hydraulic pump, and a hydraulic motor having a pair of input/output ports connected in a closed circuit to a pair of input/output ports of said variable displacement hydraulic pump by way of a pair of main pipe lines, said safety device comprising:

- a rotation detecting means for detecting a rotational condition of said prime mover;
- an opening and closing valve having a first position in which said opening and closing valve disconnects said main pipe lines from each other and a second position in which said opening and closing valve establishes communication between said main pipe lines; and
- a change-over controlling means for changing over said opening and closing valve to the second position in response to a detection of stopping of said prime mover and for changing over said opening and closing valve to the first position after lapse of a predetermined delay time after starting of said prime mover.

2. A safety device as claimed in claim 1, wherein said opening and closing valve is an electromagnetically operated valve, and when said prime mover is stopped, said opening and closing valve is immediately changed over to the second position by said change-over controlling means, but said opening and closing valve is changed over to the first position by said change-over controlling means after lapse of a predetermined delay time after starting of said prime mover.

3. A safety device as claimed in claim 1, wherein said opening and closing valve is a valve of the hydraulic pilot type which is opened or closed by pilot pressure oil delivered from a controlling hydraulic pump which is driven by said prime mover while said changeover controlling means is a slow return valve interposed between a pilot port of said opening and closing valve and said controlling hydraulic pump, and wherein when said controlling hydraulic pump is stopped upon stopping of said prime mover, a pilot oil pressure acting at said pilot port of said opening and closing valve of the hydraulic pilot type is immediately reduced to a tank pressure by way of said slow return valve so that said opening and closing valve is changed over to the second position, but when said prime mover starts its rotation, pilot pressure oil delivered from said controlling hydraulic pump acts as said pilot port of said opening and closing valve with delay time controlled by said slow return valve so that said opening and closing valve of the hydraulic pilot type is changed over to the first position after lapse of a predetermined time after starting of said prime mover.

4. A safety device as claimed in claim 3, wherein said controlling hydraulic pump is a gear pump, and when said prime mover is stopped, a pilot pressure at a pilot port of said opening and closing valve of the hydraulic pilot type is reduced through said slow return valve to a tank pressure by a leak of said gear pump, whereby said opening and closing valve is immediately changed over to the second position.

5. A safety device as claimed in claim 4, wherein said hydraulic motor is used to obtain a running force therefrom, and said tilting controlling means includes first and second cylinder chambers for controlling a tilt angle of said variable displacement hydraulic pump in response to pressure oil supplied to said first or second cylinder chamber, said hydraulic closed circuit further includes a change-over valve which is provided between said controlling hydraulic pump and said first and second cylinder chambers and changed over among a forward position, a rearward position and a neutral position by an operating member provided for selection among a forward movement, a rearward movement and a neutral, whereby pressure oil is selectively supplied to said first or second cylinder chamber of said tilting controlling means in response to a position of said change-over valve.

6. A safety device for a hydraulic closed circuit which includes a variable displacement hydraulic pump driven by a prime mover, a tilting controlling means for controlling a tilt angle of said variable displacement hydraulic pump, and a hydraulic motor having a pair of input/output ports connected in a closed circuit to a pair of input/output ports of said variable displacement hydraulic pump by way of a pair of main pipe lines, said safety device comprising:

- a rotation detecting means for detecting a rotational condition of said prime mover;
- an opening and closing valve having a first position in which said opening and closing valve disconnects said main pipe lines from each other and a second position in which said opening and closing valve establishes communication between said main pipe lines;
- a neutral detecting means for detecting a neutral condition of said tilting controlling means; and
- a change-over controlling means for changing over said opening and closing valve to the second position in response to a detection of stopping of said prime mover and for changing over said opening and closing valve to the first position when a rotating condition of said prime mover and the neutral condition of said tilting controlling means are both detected.

7. A safety device as claimed in claim 6, wherein said opening and closing valve is an electromagnetically operated valve.

8. A safety device as claimed in claim 6, wherein said hydraulic motor is used to obtain a running force therefrom, and said tilting controlling means includes first and second cylinder chambers for controlling a tilt angle of said variable displacement hydraulic pump in response to pressure oil supplied to said first or second cylinder chamber, said hydraulic closed circuit further includes a change-over valve which is provided between said controlling hydraulic pump and said first and second cylinder chambers and changed over among a forward position, a rearward position and a neutral position by an operating member provided for selection among a forward movement, a rearward movement and a neutral, whereby pressure oil is selectively supplied to said first or second cylinder chamber of said tilting controlling means in response to a position of said change-over valve.

* * * * *